No. 871,050. PATENTED NOV. 12, 1907.
J. VOGT.
CHRISTMAS TREE SUPPORT.
APPLICATION FILED MAY 13, 1907.
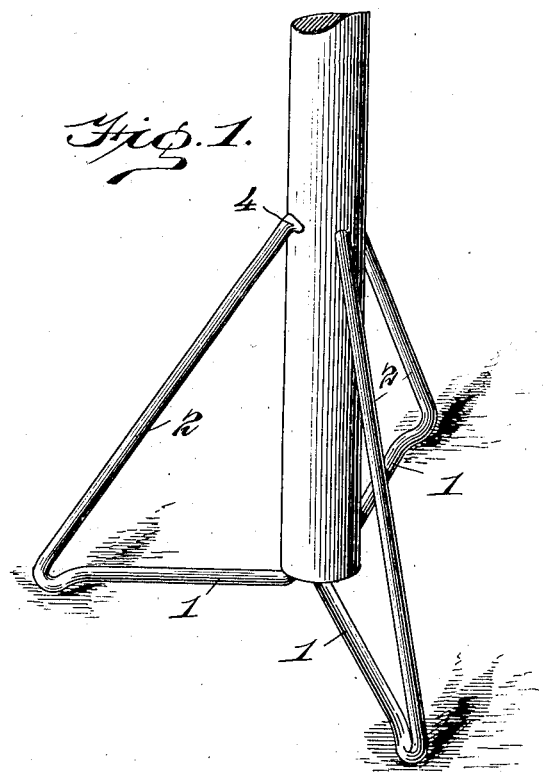
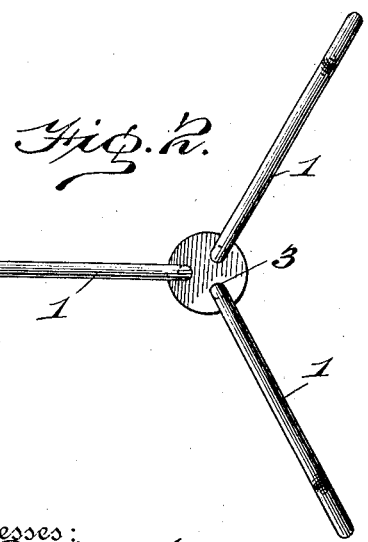
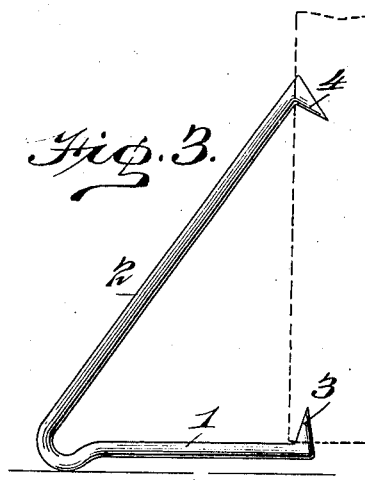
Witnesses:
Jacob Vogt
Inventor
By Attorney

UNITED STATES PATENT OFFICE.

JACOB VOGT, OF NEW ROCHELLE, NEW YORK.

CHRISTMAS-TREE SUPPORT.

No. 871,050.　　　Specification of Letters Patent.　　　Patented Nov. 12, 1907.

Application filed May 13, 1907. Serial No. 373,271.

*To all whom it may concern:*

Be it known that I, JACOB VOGT, a citizen of the United States, residing at New Rochelle, in the county of Westchester and State of New York, have invented certain new and useful Improvements in Christmas-Tree Supports, of which the following is a specification.

The invention has for its object the provision of a device that is of simple and cheap construction, easily applied, and efficient in its purpose.

It consists in the novel construction, combination and arrangement of parts, such as will be hereinafter fully described, pointed out in the appended claims and illustrated in the accompanying drawings.

In the drawings, in which similar reference characters designate corresponding parts, Figure 1 is a perspective view showing the device applied to the lower end of a tree. Fig. 2 is a plan view of the under side of the base of the device. Fig. 3 is a side elevation of one of the sections of which the device is composed.

The support or stand is formed of separate and detached sections of similar construction and a description of one will suffice for all. Each section is formed of a rod or bar of metal bent into an acute angle. The member 1 forms the base of the section and the member 2 forms an inclined brace projecting upwardly and inwardly from the outer end of the base. At the junction between the base and the brace there is a rounded projection forming a toe. At the free end of the base is the spur 3 and at the free end of the brace is the spur 4. To form these spurs the ends of the rod are bent and sharpened.

In applying the device the number of sections is regulated according to the size of the tree; ordinarily three sections are sufficient. These sections are disposed at equal intervals around the foot of the tree and each is attached by driving the spur 3 into the butt of the tree and the spur 4 is driven into the trunk some distance above the butt. When in place the sections radiate from the tree and form a firm support for the same. The bases 1 form the foundation that rests on the floor and prevents the tree from tipping and the braces 2 hold the tree in an upright position on the foundation. The toes at the junctions of the bases and braces elevate the foundation above any slight unevenness of the floor. By adjusting the sections in the tree the desired upright position can be secured.

While the support has been described as being applied to Christmas trees, yet it can be used with other objects to hold them in upright positions.

Having thus described my invention, what I claim and desire to secure by Letters Patent is,

As an improved article of manufacture, a section for a Christmas tree support formed of a bar of metal bent into an acute angle with one member forming the base and the other member forming an inclined brace extending upwardly and inwardly from the outer end of the base, the ends of said bar being bent and sharpened to form spurs on the free ends of said members.

In testimony whereof I have hereunto signed my name to this specification, in the presence of two subscribing witnesses, in the city of New Rochelle, Westchester county, New York, on the eleventh day of May, 1907.

JACOB VOGT.

Witnesses:
　LINCOLN G. BACKUS,
　NONIE F. KELLY.